United States Patent
Kori et al.

(10) Patent No.: US 8,421,285 B2
(45) Date of Patent: Apr. 16, 2013

(54) PERMANENT MAGNET TYPE ELECTRIC POWER GENERATOR

(75) Inventors: Daisuke Kori, Hitachinaka (JP);
Akiyoshi Komura, Hitachi (JP);
Masahiro Hori, Hitachi (JP)

(73) Assignee: Hitachi, Ltd, Tokyo (JP)

( * ) Notice: Subject to any disclaimer, the term of this patent is extended or adjusted under 35 U.S.C. 154(b) by 216 days.

(21) Appl. No.: 12/681,086

(22) PCT Filed: Feb. 27, 2009

(86) PCT No.: PCT/JP2009/000881
§ 371 (c)(1),
(2), (4) Date: Mar. 31, 2010

(87) PCT Pub. No.: WO2010/097837
PCT Pub. Date: Sep. 2, 2010

(65) Prior Publication Data
US 2011/0181137 A1    Jul. 28, 2011

(51) Int. Cl.
*H02K 9/00* (2006.01)
*H02K 9/06* (2006.01)
*H02K 1/32* (2006.01)

(52) U.S. Cl.
USPC .................... 310/61; 310/58; 310/62; 310/64

(58) Field of Classification Search .............. 310/61–63, 310/58, 59
See application file for complete search history.

(56) References Cited

U.S. PATENT DOCUMENTS

| | | | |
|---|---|---|---|
| 6,724,107 B1 * | 4/2004 | Ide et al. | 310/55 |
| 7,619,332 B2 * | 11/2009 | Kimura et al. | 310/58 |
| 2003/0080636 A1 * | 5/2003 | Boardman et al. | 310/58 |
| 2004/0084976 A1 * | 5/2004 | Thiot | 310/58 |
| 2004/0189110 A1 * | 9/2004 | Ide et al. | 310/55 |
| 2004/0222711 A1 * | 11/2004 | Klimt | 310/59 |
| 2006/0071568 A1 * | 4/2006 | Kimura et al. | 310/156.56 |
| 2007/0108861 A1 * | 5/2007 | Aoyama | 310/156.38 |
| 2007/0290558 A1 * | 12/2007 | Leininger | 310/71 |
| 2008/0129129 A1 | 6/2008 | Kori et al. | |
| 2008/0238224 A1 * | 10/2008 | Ressel | 310/64 |

FOREIGN PATENT DOCUMENTS

| | | |
|---|---|---|
| EP | 13090742 A2 | 5/2003 |
| EP | 1926196 A2 | 5/2008 |
| JP | 55-59547 | 4/1980 |
| JP | 2-070247 | 3/1990 |
| JP | 3-331781 | 12/1996 |
| JP | 10-248209 | 9/1998 |

(Continued)

OTHER PUBLICATIONS

Machine translation of JP10248209, Iwanaga, Sep. 1998.*

(Continued)

*Primary Examiner* — Tran Nguyen
*Assistant Examiner* — Terrance Kenerly
(74) *Attorney, Agent, or Firm* — Brundidge & Stanger, P.C.

(57) ABSTRACT

For providing a permanent magnet type generator that has a limited inside temperature rise gradient even if the capacity thereof is increased and permits to reduce the size thereof, the present invention provides a ventilation means that increases the inner gas (air or cooling wind) quantity that is caused circulated via the heat exchanger causing to flow outer air is increased more at a region facing the outer air exhaust side in the heat exchanger than at the outer air inlet side.

21 Claims, 13 Drawing Sheets

FOREIGN PATENT DOCUMENTS

| | | |
|---|---|---|
| JP | 2003-204643 | 7/2003 |
| JP | 2008-131813 | 6/2008 |
| JP | 2008-245336 | 10/2008 |
| WO | WO2008/117501 A1 | 10/2008 |

OTHER PUBLICATIONS

English Translation of International Search Report in International Application No. PCT/JP2009/000881, mailed May 26, 2009.

* cited by examiner

PERMANENT MAGNET TYPE ELECTRIC POWER GENERATOR

FIELD OF THE INVENTION

The present invention relates to a permanent magnet type electric power generator, and in particular, relates to a permanent magnet type electric power generator that is provided with a heat exchanger at the outer circumference of a stator thereof for cooling heated air inside the electric power generator by outer air through heat exchanging.

BACKGROUND ART

These years, an introduction of wind turbine generators is increasing remarkably, and in order to enhance economy through increasing capacity of a single machine, a demand of a small size and large capacity permanent magnet type electric power generator is increasing. However, when reducing the size and increasing the capacity of a permanent magnet type electric power generator is tried, since the amount of heat generated is increased, a permanent magnet type electric power generator as shown in FIG. 11 has been proposed.

Namely, the permanent magnet type generator is constituted in a sealed structure by covering a rotor 2 fixed to a rotating shaft 1 and a stator 3 arranged around the circumference of the rotor 2 via an air gap with a housing 4, and is provided with a heat exchanger 5 at the outer circumferential side of the stator 3. In this heat exchanger 5, a plurality of cooling pipes 14 are disposed along the extending direction of the rotating shaft 1, and a motor driven fan 15 is disposed at the exhaust side of the cooling pipes 14 for flowing outer air a through the cooling pipes 14.

By means of such permanent magnet type generator provided with the heat exchanger 5, inner gas (air or cooling wind) b of raised temperature that has cooled such as the rotor 2 and the stator 3 while circulating inside the housing 4 can be cooled by causing to flow through inside the heat exchanger 5 thereby to suppress a possible increase of an amount of heat generated.

A related technology that suppresses a possible increase of an amount of heat generated by passing inner air circulating in the machine through a heat exchanger is disclosed in patent document 1.

Patent Document 1: JP-A-2-70247

SUMMARY OF THE INVENTION

Tasks to be Solved by the Invention

With the permanent magnet type generator as shown in FIG. 11, the amount of heat generated can be suppressed in a certain degree. However, since the outer air a passing inside the heat exchanger 5 passes from one direction to the other direction, the cooling degree of the inner air b inside the housing 4 that passes at the inlet side of the outer air a in the heat exchanger 5 is different from that of the inner air b inside the housing 4 that passes at the exhaust side of the outer air a in the heat exchanger 5, and it is unavoidable that the temperature of the inner air b inside the housing 4 that passes at the exhaust side becomes higher.

As a result, a temperature gradient with respect to temperature in the axial direction of the stator 3 is caused as shown in FIG. 12 in which the temperature at a region facing the outer air exhaust side in the heat exchanger 5 becomes higher.

Generally, since a permanent magnet type generator is designed based on the maximum value of temperature rise in the generator, if the generator is designed so as to allow such maximum value of temperature rise, the structural size of the permanent magnet type generator has to be enlarged, and it was difficult to obtain a small sized permanent magnet type generator while increasing the capacity of the single machine.

An object of the present invention is to provide a permanent magnet type generator that has a limited inside temperature rise gradient even if the capacity thereof is increased and permits to reduce the size thereof.

Measure for Solving the Tasks

In order to achieve the above object, in the present invention, a ventilation means is provided in which an air quantity of inner gas (air or cooling wind) circulated via a heat exchanger that causes to pass outer air, is set more at a region facing the outer air exhaust side in the heat exchanger than at the outer air inlet side therein.

In the above manner, by circulating the air quantity of inner gas (air or cooling wind) more at the region facing the outer air exhaust side in the heat exchanger than at the outer air inlet side therein, a possible temperature rise such as in a stator and a rotor at the region facing the outer air exhaust side in the heat exchanger can be reduced. As a result, even when the capacity thereof is increased, the maximum value of temperature rise is reduced and the temperature gradient in the axial direction of the permanent magnet type generator is eliminated, thereby the size of the permanent magnet type generator can be reduced.

Advantages of the Invention

As has been explained above, according to the present invention, a permanent magnet type generator can be obtained that has a limited inside temperature rise gradient even if the capacity thereof is increased and permits to reduce the size thereof.

EMBODIMENTS FOR CARRYING OUT THE INVENTION

Figure 1:
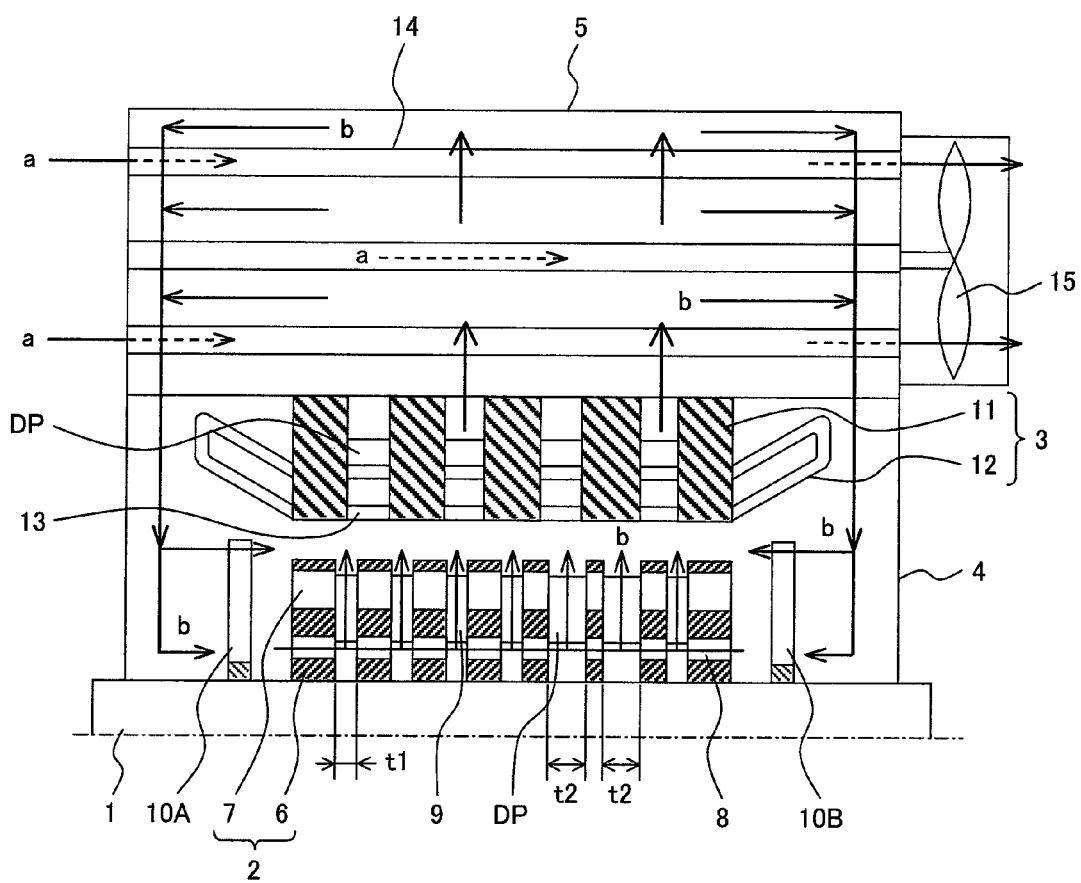
FIG. 1 is a schematic vertical cross sectional view of upper half showing a first embodiment of permanent magnet type generator according to the present invention.

Herein below, a first embodiment of permanent magnet type generator according to the present invention will be explained with reference to FIG. 1.

The permanent magnet type generator is provided with a rotating shaft 1 coupled to a prime mover, a rotor 2 fixed to the rotating shaft 1, a stator 3 arranged around the circumference of the rotor 2 via an air gap and a housing 4 covering these rotor 2 and stator 3 in a sealed manner.

The rotor 2 includes a rotor core 6 that is constituted by laminating electromagnetic plates in the axial direction and permanent magnets 7 that are buried in plural at the outer diameter side of the rotor core 6 along the circumferential direction, and at the inner diameter side of the rotor core 6 a plurality of axial direction ventilation passages 8 are formed along circumferential direction. Further, in the rotor core 6, a plurality of ventilation ducts 9 are formed in the axial direction via duct pieces DP, and are communicated to the axial direction ventilation passages 8.

Further, at regions facing both sides in the axial direction of the rotor core 6, axial fans 10A and 10B are provided on the rotating shaft 1, which blast the inner air in the housing 4 toward the center side from both sides in axial direction of the rotor 2 and the stator 3.

The stator 3 includes a stator core 11 that is constituted by laminating electromagnetic plates in the axial direction and stator windings 12 that are mounted in winding grooves (not shown) formed in the stator core 11, and in the stator core 11, a plurality of ventilation ducts 13 are formed in the axial direction via duct pieces DP.

The heat exchanger 5 has a length longer than the size in axial direction of the stator 3, and is disposed at the outer diameter side of the stator 3. Further, in this heat exchanger 5, a plurality of cooling pipes 14 are disposed along the extending direction of the rotating shaft 1, and a motor driven fan 15 is disposed at the outer air exhaust side of the cooling pipes 14 for flowing outer air a through the cooling pipes 14. Still further, the heat exchanger 5 communicates inside the housing 4, and is constituted so that the inner gas (air or cooling wind) b inside the housing 4 circulates through between the pluralities of cooling pipes 14.

Moreover, in the present embodiment, the width of the duct piece DP of the rotor 2, in other words, widths t1, t2 along the axial direction of the ventilation duct 9 are changed. Namely, the width t2 of the ventilation duct 9 at a region facing the outer air exhaust side is set wider than the width t1 of the ventilation duct 9 at a region facing the outer air inlet side in the heat exchanger 5, for example, the width t2 is determined two times wider than the width t1.

With the permanent magnet type generator according to the present embodiment constituted as explained above, during operation thereof, the inner air b inside the housing 4 circulates by an action of the axial fans 10A and 10B in such a manner that the inner air b passes through such as the axial direction ventilation passages 8 and ventilation ducts 9 and 13, reaches inside the heat exchanger 5, and from there returns again to the axial fans 10A and 10B as shown by arrows. By means of such circulation of the inner air b, such as heated rotor 2 and stator 3 are cooled. Then, the inner air b of which temperature is raised by cooling such as the rotor 2 and the stator 3 performs heat exchange with the outer air a through the pluralities of cooling pipes 14 in the heat exchanger 5 and is cooled.

Figure 12:
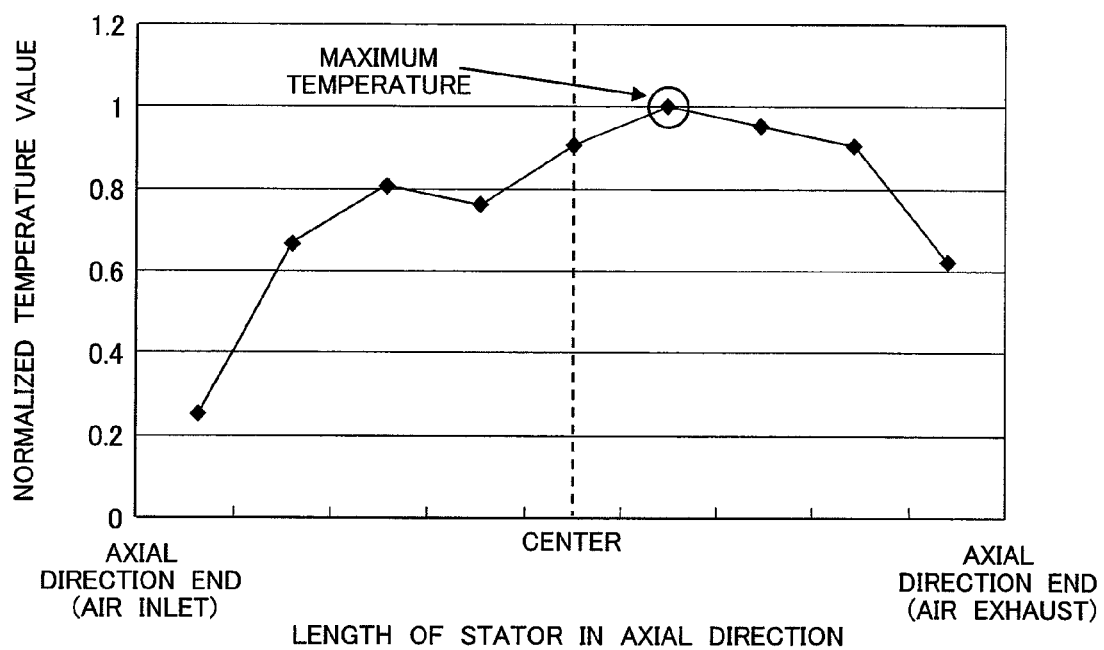
FIG. 12 is a temperature distribution diagram in a stator of the permanent magnet type generator as shown in FIG. 11.

Further, when the outer air a inside the cooling pipes 14 in the heat exchanger 5 moves from the outer air inlet side to the outer air exhaust side, the temperature thereof gradually rises through the heat exchange with the inner air a. For this reason, the heat exchange rate between the outer air a and the inner air b at the region facing the outer air exhaust side reduces. However, since the width t2 of the ventilation duct 9 at the region facing the outer air exhaust side is widened to reduce ventilation resistance for the inner air b, and the air quantity is set larger than that at the region facing the outer air inlet side, resultantly, temperature gradient in the axial direction of the rotor 2 and the stator 3 is eliminated and the cooling is performed under a uniform temperature distribution. As a result, it was confirmed through experiments that the maximum temperature as shown in FIG. 12 can be reduced by 20% and the projecting temperature rise portion is eliminated. Accordingly, since the permanent magnet type generator can be designed based on the uniformalized temperature, a permanent magnet type generator can be obtained that permits size reduction thereof even if the capacity thereof is increased.

In the present embodiment, the constitution in which the width t2 of the ventilation duct 9 at a region facing the outer air exhaust side is set wider than the width t1 of the ventilation duct 9 at a region facing the outer air inlet side in the heat exchanger 5, corresponds to such as a ventilation means and an air quantity increasing means in which air quantity of the inner air circulating via the heat exchanger 5 that causes to pass the outer air according to the present invention is set larger at the region facing the outer air exhaust side than that at the outer air inlet side in the heat exchanger 5. Further, the constitution in which the width t2 of the ventilation duct 9 is set wider also corresponds to such as a ventilation means for reducing ventilation resistance and a ventilation resistance reducing means.

Further, in the present embodiment, although the number of positions where the ventilation ducts 9 are disposed in the axial direction of the rotor 2 is selected as seven, and among these, the width of the ventilation ducts 9 at two positions near the portion where the maximum temperature as shown in FIG. 12 appears is widened as t2, the present invention is not limited to these numbers.

Further, in the present embodiment, the width of the ventilation duct 9 positioned at the end portion in the axial direction of the rotor 2 at the region facing the outer air exhaust side is determined as t1 that is the same as those at the outer air inlet side. The reason is as follows, in that since the cooled inner air b from the axial fan 10B is introduced directly into the ventilation duct 9 of the rotor 2 and the ventilation duct 13 of the stator 3, and directly cools the end portions of such as the rotor 2 and the stator 3, the temperature rise at the end portion is limited as shown in FIG. 12, therefore, the width of the ventilation duct 9 positioned at the end portion in the axial direction in the region facing the outer air exhaust side is determined as t1 same as the width of the ventilation ducts at the outer air inlet side, and the width of the ventilation ducts 9 positioned in the region facing the outer air exhaust side but shifted toward the outer air inlet side from the end portion in the axial direction is maximized as t2.

Figure 13:
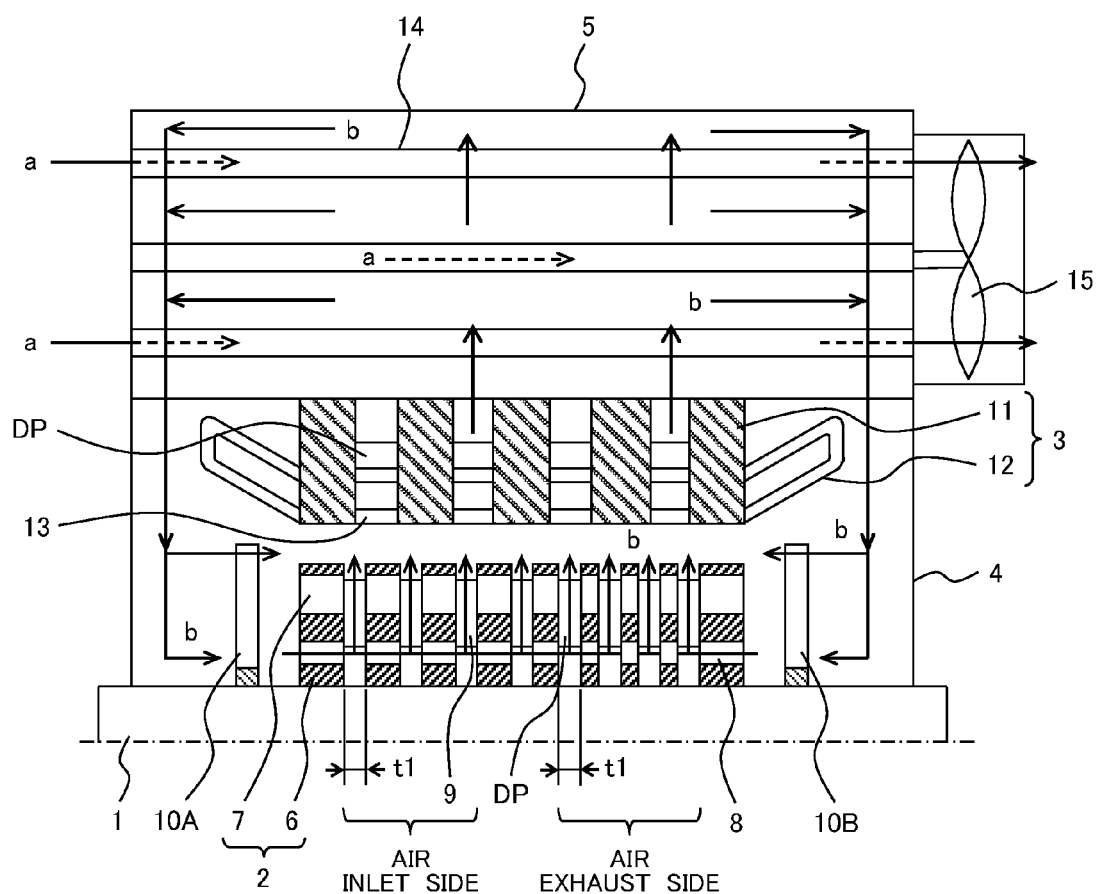
FIG. 13 a view corresponding to FIG. 1 showing a tenth embodiment of permanent magnet type generator according to the present invention.

Now, in the present embodiment, although the width t2 of the ventilation duct 9 at the region facing the outer air exhaust side is determined larger than the width t1 of the ventilation ducts 9 at the region facing the outer air inlet side, and the air quantity of the inner air b at the region facing the outer air exhaust side is increased more than that at the outer air inlet side in the heat exchanger 5, number of positions where the ventilation duct 9 having the same width t1 at the region facing the outer air exhaust side can be selected more than that at the outer air inlet side in the heat exchanger 5 so as to increase the air quantity of the inner air b therein. As shown in FIG. 13, the number of the ventilation ducts in the rotor at the region facing the outer air exhaust side is increased more than the number of the ventilation ducts in the rotor at the region facing the outer air inlet side in the heat exchanger. Further, the number of positions where the ventilation duct 9 is disposed can be maximized at the region facing the maximum temperature rise portion as shown in FIG. 12, and from there, the number of positions where the ventilation ducts 9 are disposed can be gradually decreased toward both sides in the axial direction.

Nextly, a second embodiment of the present invention will be explained with reference to FIG. 2. Wherein, since ones bearing the same reference numerals as in FIG. 1 show the same constitutional members as in FIG. 1, further detailed explanation thereof is omitted.

Figure 2:
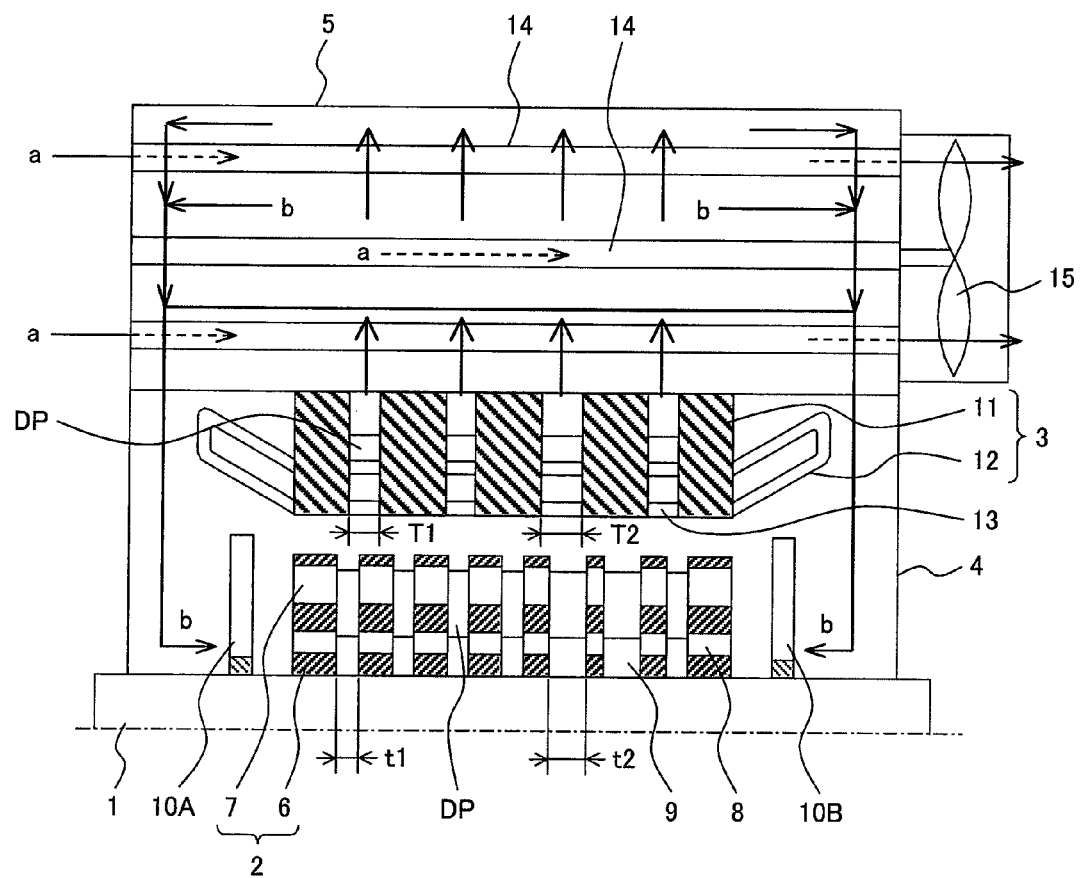
FIG. 2 is a view corresponding to FIG. 1 showing a second embodiment of permanent magnet type generator according to the present invention.

In the present embodiment, a constitution different from that of the first embodiment as shown in FIG. 1 is that the width T2 of the ventilation duct 13 in the stator 3 facing the widened width t2 of the ventilation duct 9 in the rotor 2 is also widened more than the width T1 of the remaining ventilation ducts 13.

By constituting in such manner, such as the inner air b from the widened ducts 9 in the rotor 2 and the inner air b from the axial fan 10B flow in easily and smoothly into the widened ventilation duct 13. As a result, since the flow rate of the inner air b to the maximum temperature rise portion can be further increased, and the cooling can be performed efficiently.

Figure 3:
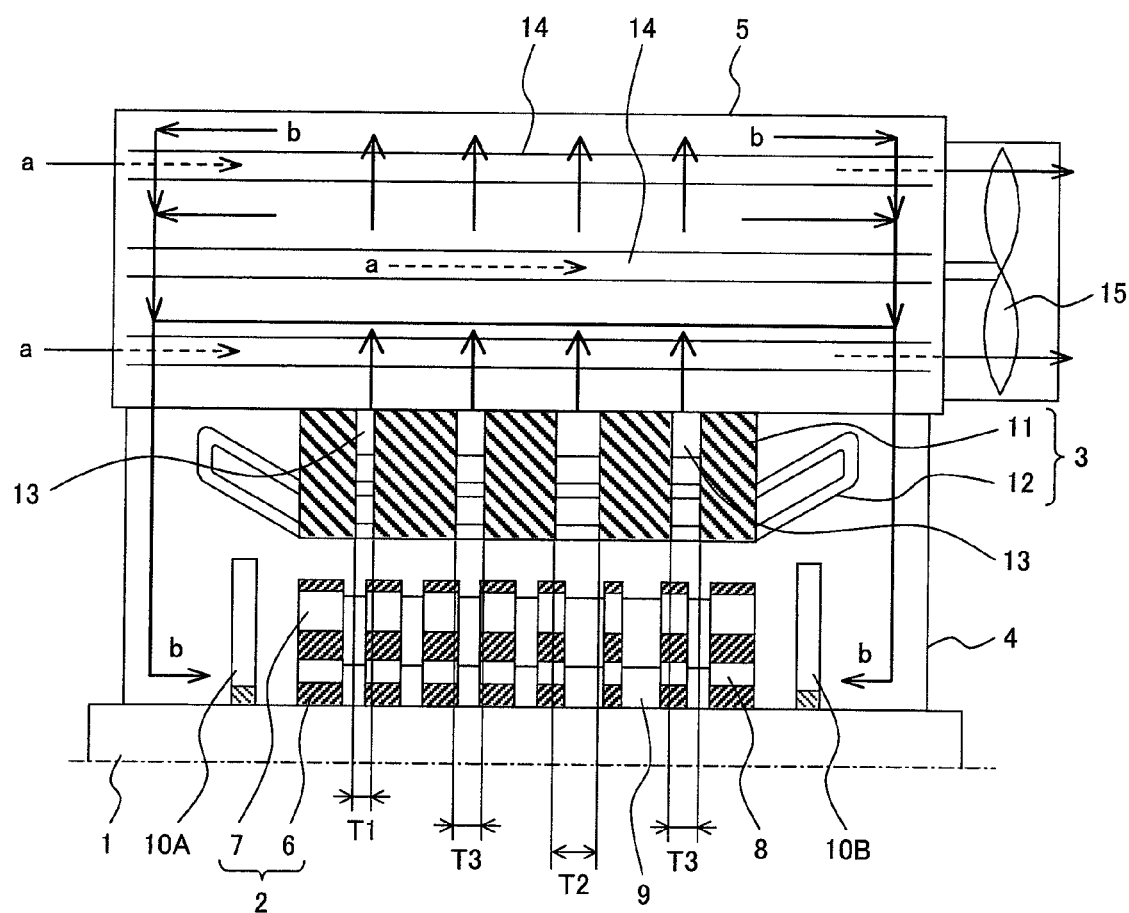
FIG. 3 is a view corresponding to FIG. 1 showing a third embodiment of permanent magnet type generator according to the present invention.

FIG. 3 shows a third embodiment according to the present invention, and has the same constitution as that of the first embodiment excepting that the width of the ventilation ducts 13 in the stator 3 is differentiated.

In the present embodiment, a constitution different from the first embodiment is that the width T2 of the ventilation duct 13 in the stator 3 facing the widened width t2 of the ventilation duct 9 in the rotor 2 is maximized, from there the widths of the ventilation ducts 13 are gradually narrowed (gradually decreased) toward both sides in axial direction in a manner as T3 to T1.

By constituting in such manner, the ventilation amount of the inner air b can be distributed in further detail in accordance with the temperature distribution in the stator 3, and the temperature distribution can be further uniformalized.

Figure 4:
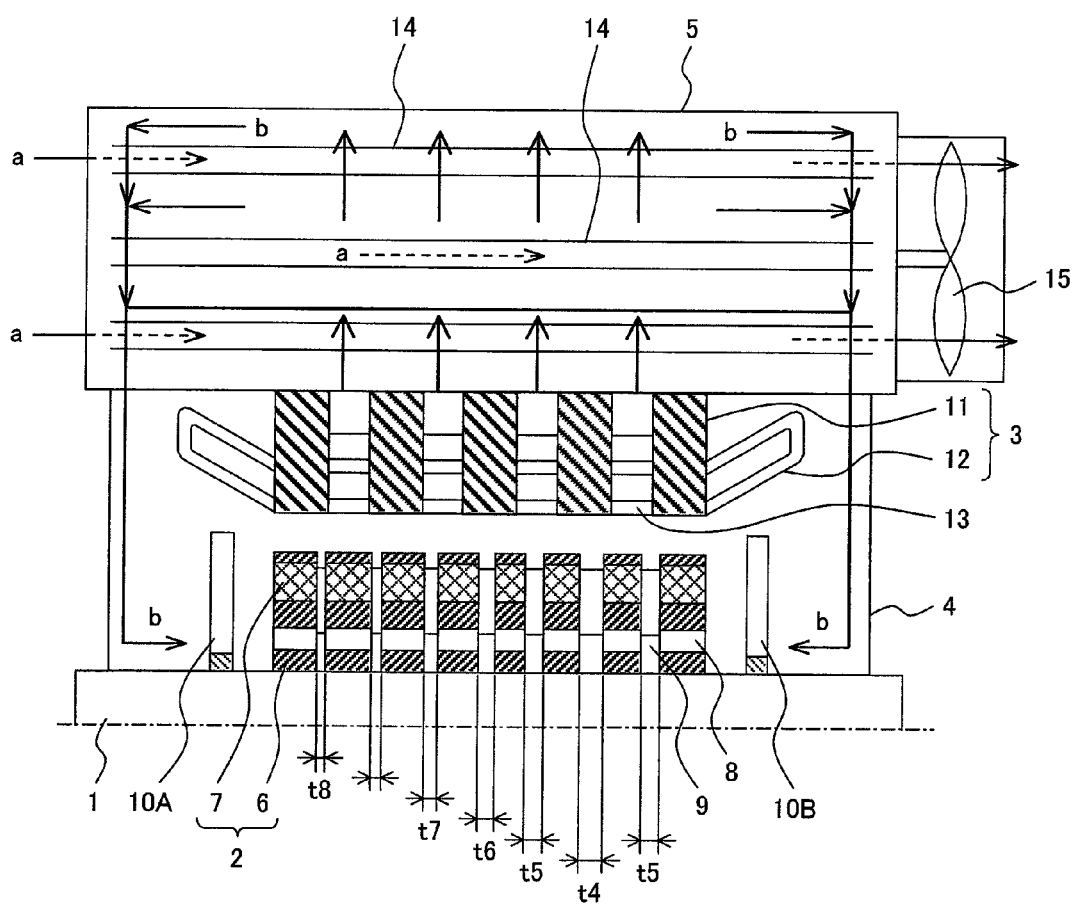
FIG. 4 is a view corresponding to FIG. 1 showing a fourth embodiment of permanent magnet type generator according to the present invention.

FIG. 4 shows a fourth embodiment according to the present invention, and has the same constitution as that of the first embodiment excepting that the width of the ventilation ducts 9 in the rotor 2 is differentiated.

In the present embodiment, a constitution different from the first embodiment is that the width t4 of the ventilation duct 9 in the rotor 2 at the region facing the maximum temperature rise portion at the outer air exhaust side in the heat exchanger 5 is maximized, from there the widths of the ventilation ducts 9 are gradually narrowed toward both sides in axial direction in a manner as t5, t6, t7 to t8.

By constituting in such manner, the cooling can be performed in further detail in accordance with the temperature distribution in the stator 3, and the temperature distribution can be further uniformalized.

Figure 5:
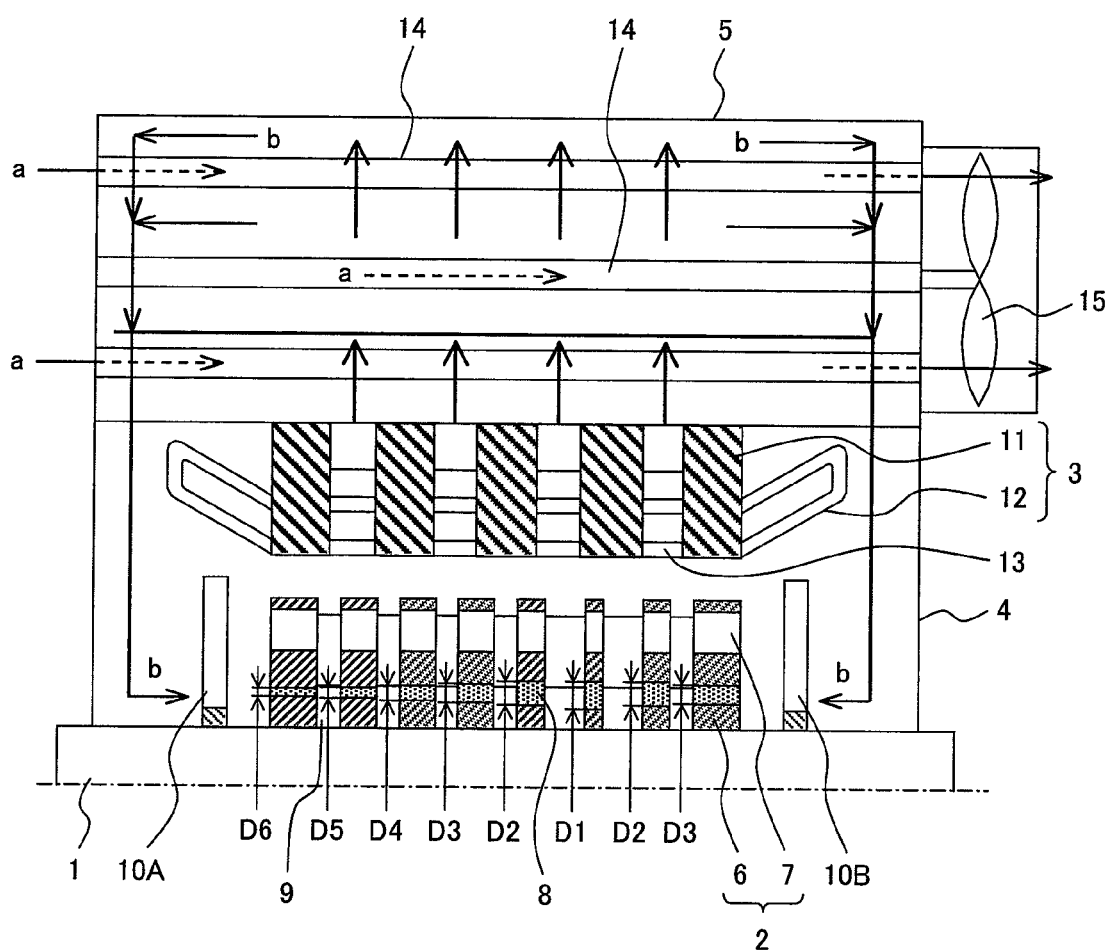
FIG. 5 is a view corresponding to FIG. 1 showing a fifth embodiment of permanent magnet type generator according to the present invention.

FIG. 5 shows a fifth embodiment according to the present invention, and has the same constitution as that of the first embodiment excepting that the cross sectional areas of the axial direction ventilation passages 8 in the rotor 2 are differentiated.

In the present embodiment, a constitution different from the first embodiment is that the cross sectional area D1 of the axial direction ventilation passage 8 in the rotor 2 at the region facing the maximum temperature rise portion at the outer air exhaust side in the heat exchanger 5 is maximized, from there the areas of the ventilation passages 8 are gradually reduced toward both sides in axial direction in a manner as D2, D3, D4, D5 to D6.

By constituting in such manner, the equivalent advantages as in fourth embodiment can be achieved. Further, the extent of the cross sectional areas D1, D2, D3, D4, D5 and D6 is not necessarily limited to that of gradually decreasing from the maximum cross sectional area D1 toward both sides in axial direction, the extent of the respective cross sectional areas D1, D2, D3, D4, D5 and D6 can be varied arbitrarily depending on such as types of permanent magnet type generators and circulation passages of the inner air b, if the air quantity of the inner air fed to the maximum temperature rise portion is resultantly maximized.

Figure 6:
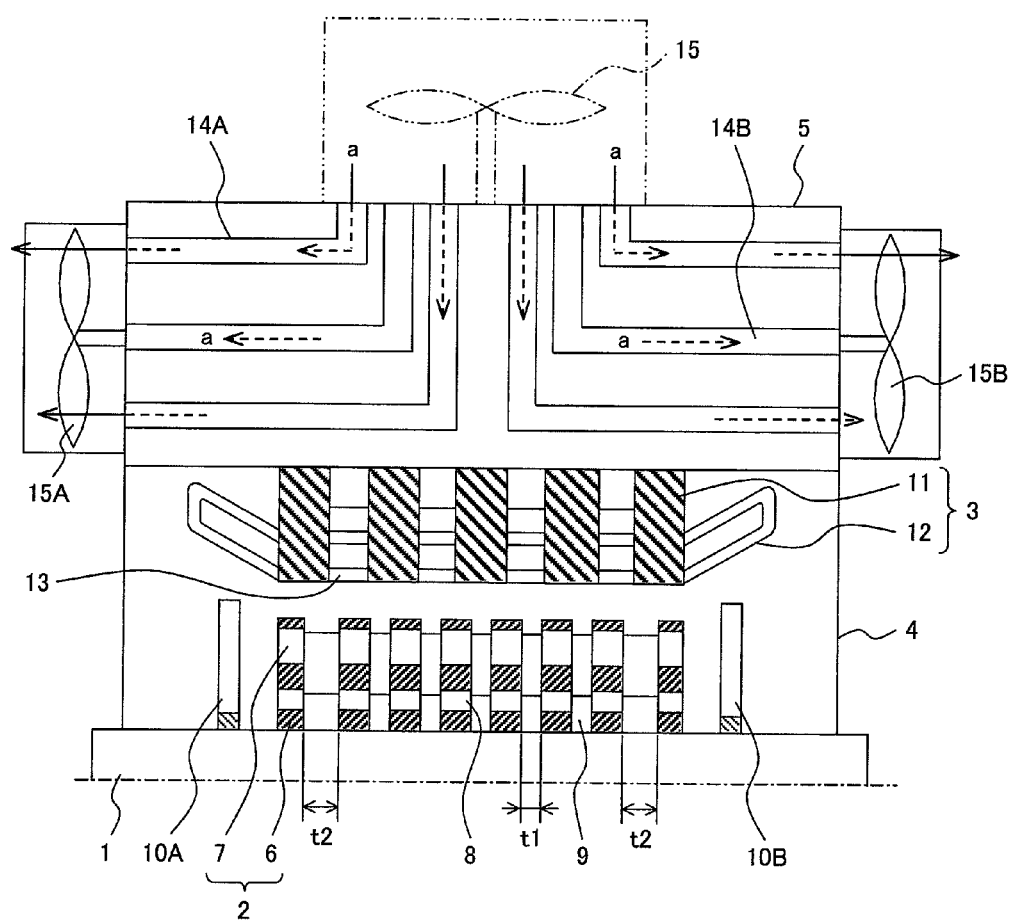
FIG. 6 is a view corresponding to FIG. 1 showing a sixth embodiment of permanent magnet type generator according to the present invention.

FIG. 6 shows a sixth embodiment according to the present invention, and has the same constitution as that of the first embodiment excepting that the axial direction ventilation passages 8 in the rotor 2 and the constitution of the heat exchanger 5 are differentiated.

In the present embodiment, constitutions different from the first embodiment are that the cooling pipes 14A and 14B in the heat exchanger 5 are formed to run from middle in axial direction toward both sides in axial direction, motor driven fans 15A and 15B respectively facing both end sides in axial direction of the cooling pipes 14A and 14B are provided, and the outer air a is introduced from the middle in axial direction and is exhausted from both sides in axial direction, and that the width t2 of the ventilation ducts 9 in the rotor 2 at regions respectively facing the outer air exhaust sides in the heat exchanger 5 are maximized, and the width of other ventilation ducts 9 is set as t1 that is narrower than t2.

As in the above manner, even for such heat exchanger 5 in which the outer air is introduced from one portion and the outer air is exhausted from two portions, the present invention is also applicable, and the equivalent advantage as in the respective previous embodiments can be achieved.

Further, as an alternative of the present embodiment, while disposing the cooling pipes 14A and 14B in the heat exchanger 5 as it is, the motor driven fans 15A and 15B are removed, and instead of this a motor driven fan 15 can be disposed at the middle in axial direction of the cooling pipes 14A and 14B as indicated by two-dot chain lines in FIG. 6.

In this instance, a pressure type fan can be used for the motor driven fan 15 in which the outer air a is introduced from the middle in axial direction and is exhausted from the both sides in axial direction, alternatively, a suction type fan can be used for the motor driven fan 15 in which the outer air a is introduced from the both sides in axial direction and is exhausted from the middle in axial direction. However, in the instance where the flowing direction of the outer air a is inverted as that shown in FIG. 6, the width of the ventilation ducts 9 at the middle portion in the axial direction in the rotor 2 is required widened more than those at both end portions in the axial direction.

Figure 7:
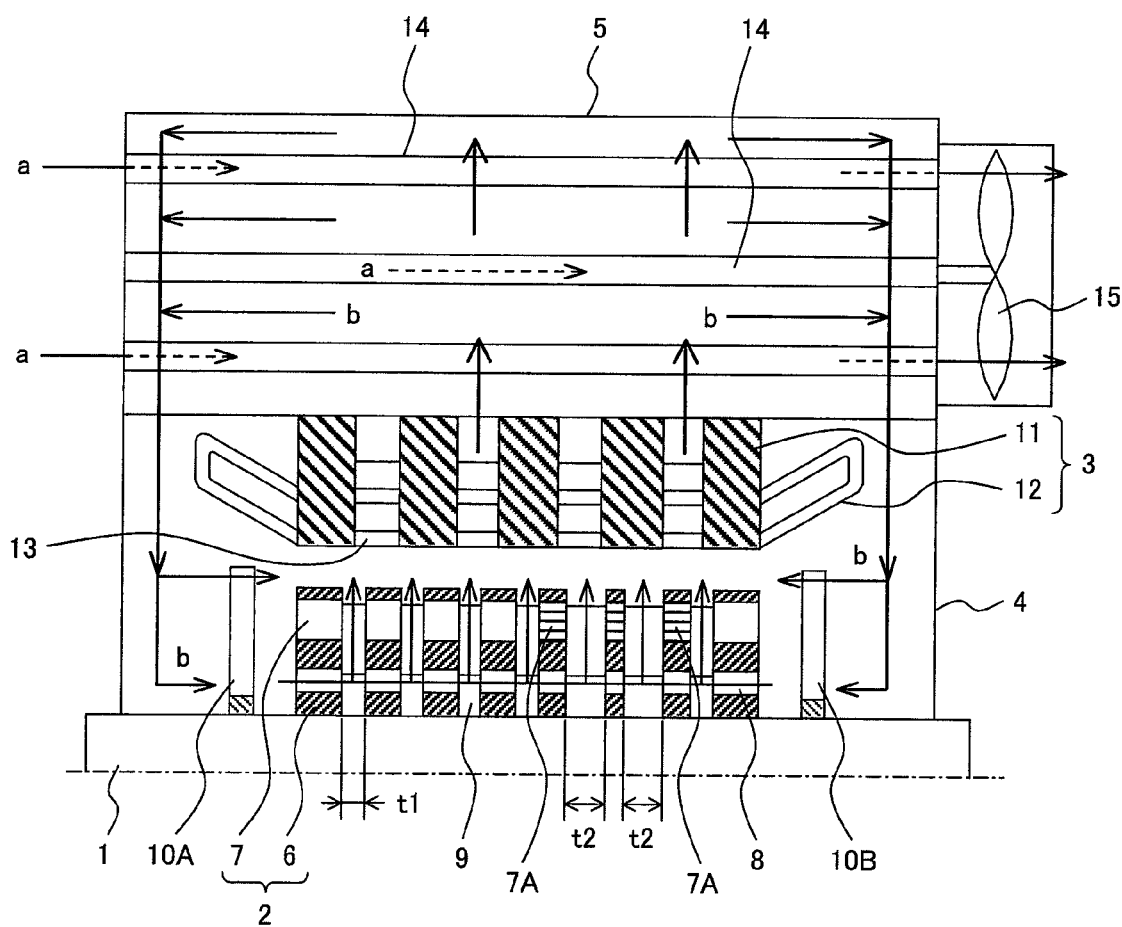
FIG. 7 is a view corresponding to FIG. 1 showing a seventh embodiment of permanent magnet type generator according to the present invention.

FIG. 7 shows a seventh embodiment according to the present invention, and has the same constitution as that of the first embodiment excepting that a part that constitutes the rotor 2 is different.

In the present embodiment, the constitution different from the first embodiment is that the magnetic force of a permanent magnets 7A buried in the rotor core 6 adjacent the ventilation duct 9 having the widened width t2 in the rotor 2 is set larger than that of the permanent magnets 7 buried in other portions.

By constituting in such manner, the equivalent advantages as in first embodiment can of course be achieved, further, since the magnetic force reduced due to the widened width t2 of the ventilation duct 9 is reinforced and the magnetic force is uniformalized in the axial direction, such as a possible reduction of electrical characteristic is prevented and loads acting on bearing devices supporting the rotating shaft 1 at both sides thereof can be uniformalized.

Figure 8:
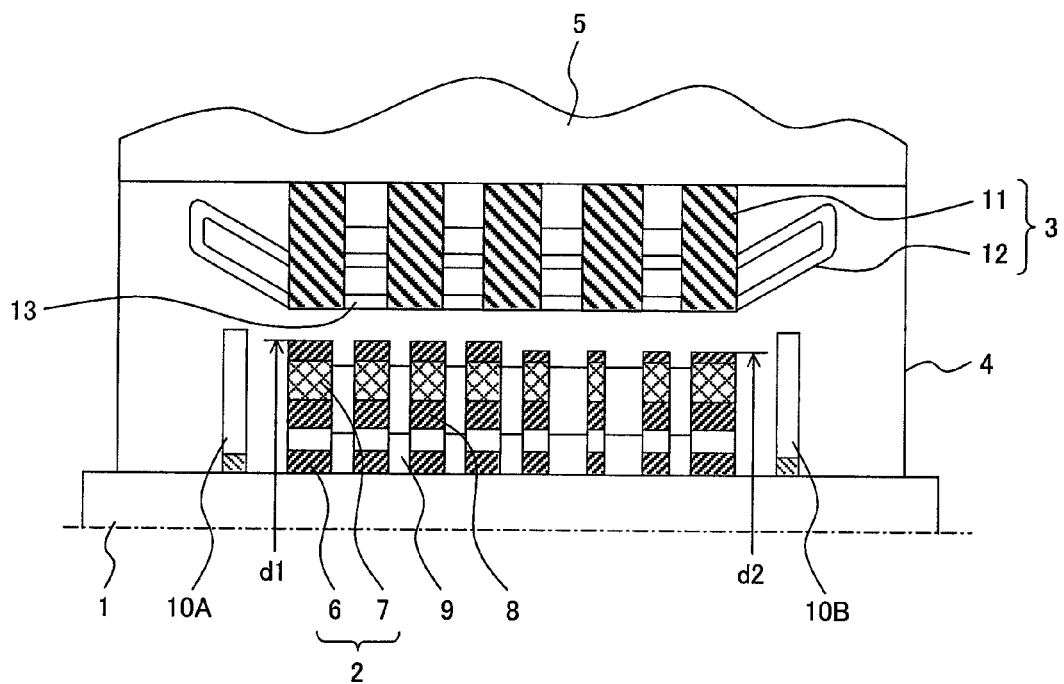
FIG. 8 is a view corresponding to FIG. 1 showing an eighth embodiment of permanent magnet type generator according to the present invention.

FIG. 8 shows an eighth embodiment according to the present invention, and has the same constitution as that of the first embodiment excepting that a part that constitutes the rotor 2 is different.

In the present embodiment, the constitution different from the first embodiment is that the outer diameter d2 of the rotor core 6 at the region facing the outer air exhaust side in the heat exchanger 5 is set smaller than the outer diameter d1 at the region facing the outer air inlet side, and the air gap from the inner circumferential face of the stator core 11 is widened.

By constituting in such manner, since the inner air b is easily introduced into the air gap between the rotor 2 and the stator 3 at the region facing the outer air exhaust side in the heat exchanger 5, the maximum temperature caused at the outer air exhaust side is reduced, and the temperature distribution is uniformalized.

Figure 9:
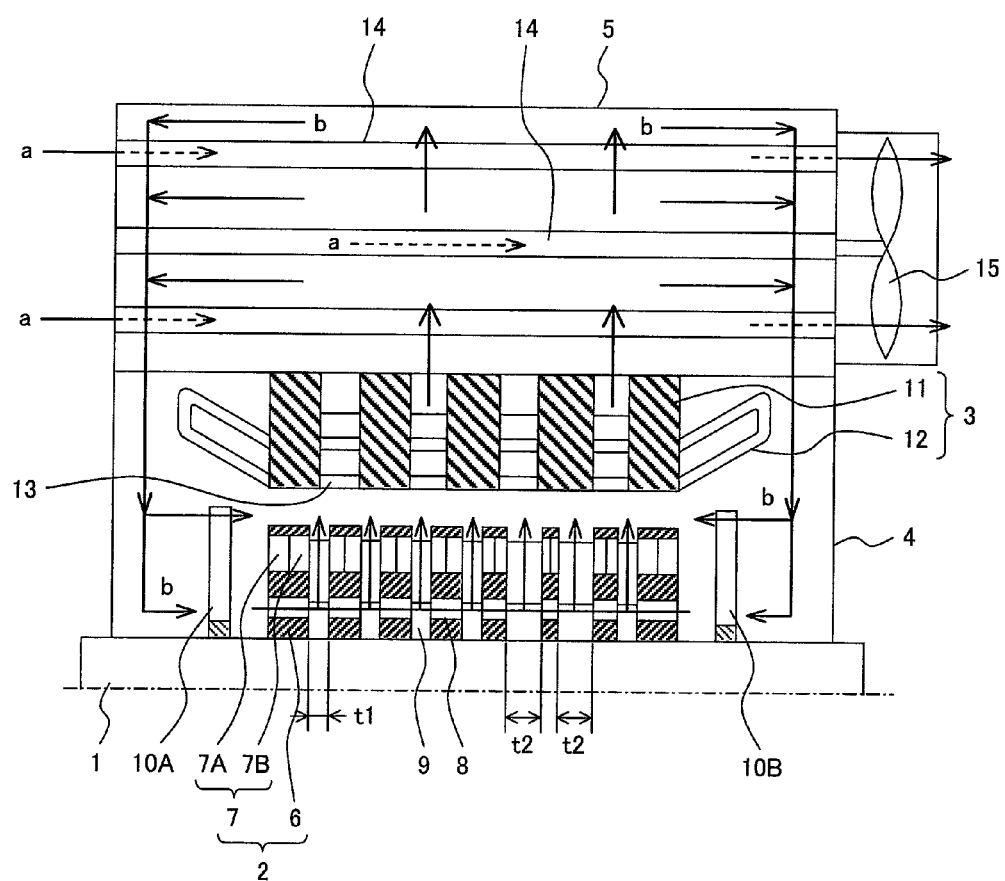
FIG. 9 is a view corresponding to FIG. 1 showing a ninth embodiment of permanent magnet type generator according to the present invention.

FIG. 9 shows a ninth embodiment according to the present invention, and has the same constitution as that of the first embodiment excepting that a part that constitutes the rotor 2 is different.

In the present embodiment, the constitution different from the first embodiment is that the permanent magnet 7 buried in the rotor core 6 is divided in the axial direction into permanent magnets 7A and 7B and buried.

By constituting in such manner, other than achieving the equivalent advantages as in first embodiment, since the amount of heat generated due to eddy current loss caused in the permanent magnets 7A and 7B can be reduced, the total temperature rise of the permanent magnet type generator can be suppressed.

Figure 10:
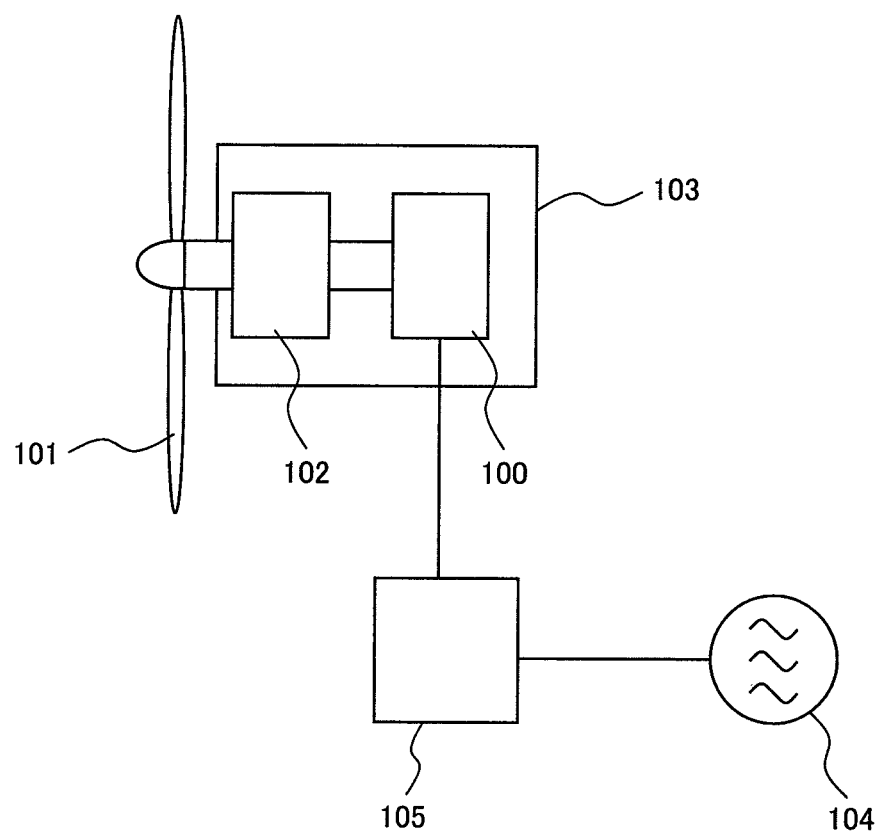
FIG. 10 is a schematic diagram showing a wind power generation system to which a permanent magnet type generator according to the present invention is applied.
Figure 11:
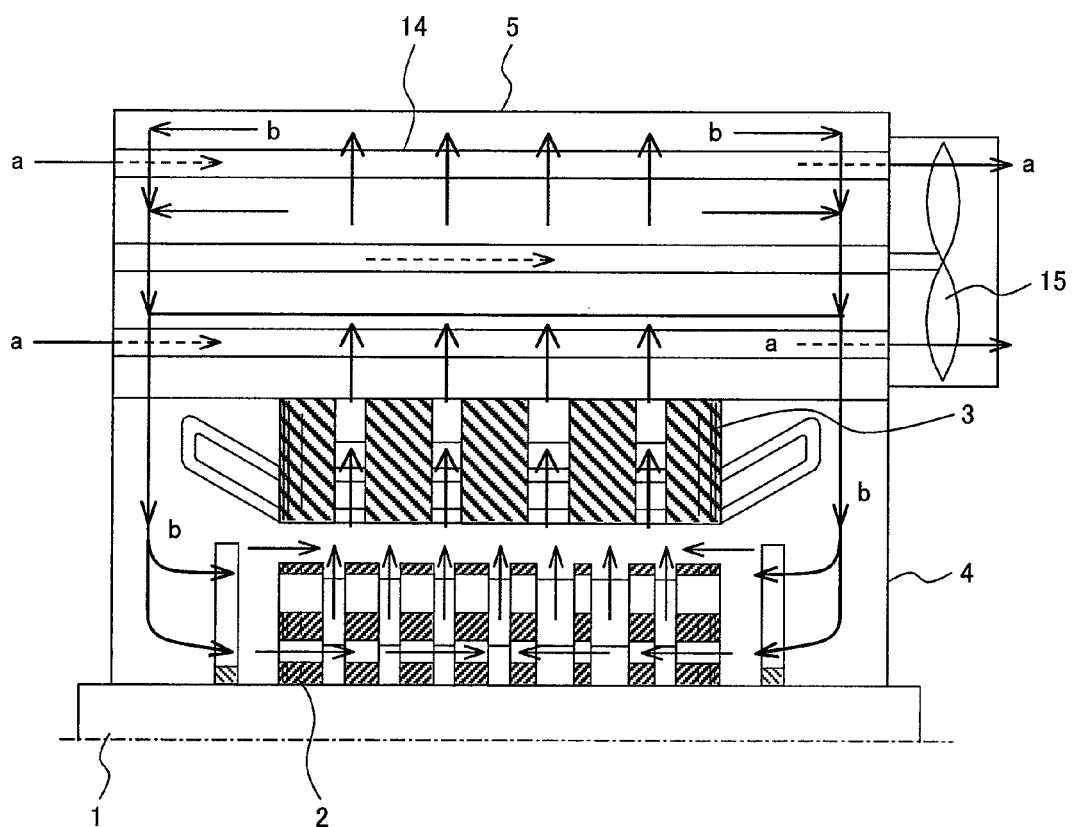
FIG. 11 is a view corresponding to FIG. 1 showing a conventional permanent magnet type generator.

Further, FIG. 10 shows an example in which any of the permanent magnet type generators according to the respective embodiments is applied to a wind power generation system.

A permanent magnet type generator 100 is rotatably connected to a windmill 101 serving as a prime mover via a speed reduction means 102, and is disposed inside a windmill nacelle 103. Then, the permanent magnet type generator 100 is electrically connected to a load 104 via a power converter 105, and performs power generating operation.

Further, although the permanent magnet type generator 100 is rotatably connected to the windmill 101 via the speed reduction means 102, the same can be directly connected to the windmill 101.

In the above manner, when the small sized and large capacity permanent magnet type generator 100 according to the present invention is applied for the wind power generation system, the size of the total windmill nacelle 101 can be reduced.

INDUSTRIAL APPLICABILITY

In the respective embodiments, although the permanent magnet type generators applicable to wind power generation systems are explained, the permanent magnet type generators can be used by coupling with such as a water turbine, engine and steam turbine serving as a prime mover.

The invention claimed is:

1. A permanent magnet type generator in which a stator and a rotor burying permanent magnets are accommodated in a housing, comprising:
    a heat exchanger that is arranged at the outer circumferential side of the stator,
    wherein the heat exchanger causes outer air to flow and cools cooling wind by circulating the cooling wind in the housing,
    wherein the heat exchanger cools the cooling wind by exchanging heat between the outer air introduced from the outer air inlet side of the heat exchanger and the cooling wind, returns the cooling wind into the housing, and exhausts the outer air heat-exchanged with the cooling wind from he outer air exhaust side of the heat exchanger,
    wherein the cooled cooling wind is ventilated to and cools the rotor and the stator, and
    wherein the heat exchanger is constituted in such a manner that the temperature in an axial direction of the stator becomes higher at a region facing the outer air exhaust side of the heat exchanger than at the outer air inlet side of the heat exchanger; and
    an air quantity increasing means for increasing the air quantity of the cooling wind that is circulated via the heat exchanger and is flowed from the inner diameter side of the rotor to the outer diameter side thereof is disposed at a region facing the outer air exhaust side in the heat exchanger where the temperature rise in the stator maximizes.

2. A permanent magnet type generator according to claim 1,
    wherein the rotor includes axial direction ventilation passages and a plurality of radial direction ventilation ducts formed along axial direction and communicating with the axial direction ventilation passages, and the stator includes a plurality of ventilation ducts formed along axial direction, and
    wherein the rotor comprises an air quantity increasing means that increases the air quantity of the cooling wind that circulates via the heat exchanger and is caused to flow through the axial direction ventilation passages and the radial direction ventilation ducts and to pass the same from the inner diameter side of the rotor to the outer diameter side thereof more at a region facing the outer air exhaust side than at the outer air inlet side in the heat exchanger.

3. A permanent magnet type generator according to claim 1, wherein the air quantity increasing means is constituted in a manner that the width of the ventilation duct in the rotor at the region facing the outer air exhaust side becomes wider than the width of the ventilation ducts in the rotor at the region facing the outer air inlet side in the heat exchanger.

4. A permanent magnet type generator according to claim 1, wherein the air quantity increasing means is constituted in a manner that the width of the ventilation duct in the rotor at the region facing the outer air exhaust side in the heat exchanger where the temperature rise in the stator maximizes is maximized, and the width of the ventilation ducts is gradually decreased a distance away from the ventilation duct with the maximized width.

5. A permanent magnet type generator according to claim 1, wherein the air quantity increasing means is constituted in a manner that the number of the ventilation ducts in the rotor at the region facing the outer air exhaust side is increased more than the number of the ventilation ducts in the rotor at the region facing the outer air inlet side in the heat exchanger.

6. A permanent magnet type generator according to claim 1, wherein the air quantity increasing means is constituted in a manner that the number of the ventilation ducts in the rotor at the region facing the outer air exhaust side in the heat exchanger where the temperature rise in the stator maximizes is maximized, and the number of the ventilation ducts is gradually decreased a distance away from the ventilation duct with the maximized number.

7. A permanent magnet type generator according to claim 5, wherein the number of the ventilation ducts is the number in axial direction.

8. A permanent magnet type generator according to claim 1,
wherein the rotor includes axial direction ventilation passages and a plurality of radial direction ventilation ducts formed along axial direction and communicating with the axial direction ventilation passages, and the stator includes a plurality of ventilation ducts formed along axial direction, and
wherein the rotor comprises an air quantity increasing means that increases the air quantity of the cooling wind more at a region facing the outer air exhaust side than at the outer air inlet side in the heat exchanger by widening the air gap between the rotor and the stator at the region facing the outer air exhaust side in the heat exchanger more than the air gap between the rotor and the stator at the region facing the outer air inlet side.

9. A permanent magnet type generator according to claim 2, wherein the width of the ventilation ducts in the stator at the region facing the outer air exhaust side in the heat exchanger is widened more than the width at the outer air inlet side.

10. A permanent magnet type generator according to claim 1, wherein the magnetic force of the permanent magnet buried in the rotor at the region facing the outer air exhaust side is increased more than the magnetic force of the permanent magnet buried in the rotor at the region facing the outer air inlet side.

11. A permanent magnet type generator according to claim 1, wherein the magnetic force of the permanent magnet buried in the rotor is divided in axial direction.

12. A permanent magnet type generator in which a stator and a rotor burying permanent magnets are accommodated in a housing, comprising:
a heat exchanger that is arranged at the outer circumferential side of the stator, causes to flow outer air and cools cooling wind by circulating cooling wind in the housing,
wherein the heat exchanger cools the cooling wind by exchanging heat between the outer air introduced from the outer air inlet side of the heat exchanger and the cooling wind, return the cooling wind into the housing, and exhausts the outer air heat-exchanged with the cooling wind from the outer air exhaust side of the heat exchanger, wherein the cooled cooling wind is ventilated to and cools the rotor and the stator, and
wherein the heat exchanger is constituted in such a manner that the temperature in axial direction of the stator becomes higher at a region facing the outer air exhaust side of the heat exchanger than at the outer air inlet side of the heat exchanger; and
a ventilation resistance decreasing means for decreasing the ventilation resistance of the cooling wind that is circulated via the heat exchanger and is flowed from the inner diameter side of the rotor to the outer diameter side thereof is disposed at a region facing the outer air exhaust side in the heat exchanger where the temperature rise in the stator maximizes.

13. A permanent magnet type generator according to claim 12, wherein the ventilation resistance decreasing means is constituted in a manner that the ventilation resistance at the region facing the outer air exhaust side in the heat exchanger where the temperature rise in the stator maximizes is minimized, and the ventilation resistance is gradually increased a distance away from the region with the minimized ventilation resistance.

14. A permanent magnet type generator in which a stator and a rotor burying permanent magnets are accommodated in a housing, comprising:
a heat exchanger that is arranged at the outer circumferential side of the stator, causes to flow outer air and cools an inner air by circulating the inner air in the housing,
wherein the heat exchanger cools the inner air by exchanging heat between the outer air introduced from the outer air inlet side of the heat exchanger and the inner air returns the inner air into the housing and exhausts the outer air heat-exchanged with the inner air from he outer air exhaust of the heat exchanger,
wherein the cooled inner air is ventilated to and cools the rotor and the stator, and
wherein the heat exchanger is constituted in such a manner that the temperature in axial direction of the stator becomes higher at a region facing the outer air exhaust side of the heat exchanger than at the outer air inlet side;
a ventilation means for increasing the inner air quantity that is circulated via the heat exchanger causing to flow the outer air is disposed at a region facing the outer air exhaust side in the heat exchanger where the temperature rise in the stator maximizes.

15. A wind power generation system,
wherein the system uses a permanent magnet type generator according to claim 1, and
wherein the permanent magnet type generator is disposed inside a windmill nacelle, is connected rotatably to a windmill and electrically connected to a load via a power converter.

16. The permanent magnet type generator according to claim 2, wherein the cooling wind passed from the inner diameter side of the rotor to the outer diameter side thereof cools the rotor and the stator, and is cooled by heat exchange with the outer air.

17. The permanent magnet type generator according to claim 16,
wherein the heat exchanger has a plurality of cooling pipes disposed along the extending direction of a rotating shaft to which the rotor is fixed, and
wherein the outer air flows through the cooling pipes, and the cooling wind passes through between the cooling pipes whereby the cooling wind is cooled by heat exchanged with the outer air.

18. The permanent magnet type generator according to claim 17, wherein axial fans are provided at regions facing both sides in the axial direction of the rotor respectively and blast the cooling wind toward the center side from both sides in the axial direction of the rotor and the stator.

19. A permanent magnet type generator, comprising:
a stator;
a rotor burying permanent magnets;
a housing accommodating the stator and the rotor; and
a heat exchanger that is arranged at the outer circumferential side of the stator,
wherein the heat exchanger cools a cooling wind which circulates in the housing by exchanging heat between an outer air introduced from the outer air inlet side of the heat exchanger and flowing along the extending direction of an rotating shaft to which the rotor is fixed and the cooling wind, returns the cooled cooling wind into the housing, and exhausts the outer air heat-exchanged with the cooling wind from the outer air exhaust side of the heat exchanger,
wherein the rotor includes axial direction ventilation passages and a plurality of radial direction ventilation ducts formed along an axial direction and communicating with the axial direction ventilation passages, and the stator includes a plurality of ventilation ducts formed along the axial direction,
wherein the cooling wind circulates via the heat exchanger, is ventilated toward the center side from both sides in the axial direction of the rotor and the stator, is caused to flow through the axial direction ventilation passages and the radial direction ventilation ducts and to pass the same from the inner diameter side of the rotor to the outer diameter side thereof, cools the rotor and the stator, and is cooled by heat exchange with the outer air, and
wherein the width of the radial direction ventilation duct in the rotor at the region facing the outer air exhaust side of the heat exchanger is wider than the width of the radial direction ventilation ducts in the rotor at the region facing the outer air inlet side of the heat exchanger.

20. The permanent magnet type generator according to claim 19,
wherein the heat exchanger has a plurality of cooling pipes disposed along the extending direction of an rotating shaft to which the rotor is fixed, and
wherein the outer air flows through the cooling pipes, and the cooling wind passes through between the cooling pipes whereby the cooling wind is cooled by heat exchange with the outer air.

21. The permanent magnet type generator according to claim 20, wherein the width of the radial direction ventilation duct positioned at the end portion in the axial direction of the rotor at the region facing the outer air exhaust side is the same as those at the outer air inlet side.

* * * * *